(12) United States Patent
Bennett

(10) Patent No.: US 8,194,587 B2
(45) Date of Patent: *Jun. 5, 2012

(54) ADAPTIVE NETWORK SUPPORTING SINGLE TO CONCURRENT INTERFERING WIRELESS TRANSMISSIONS

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 1024 days.

This patent is subject to a terminal disclaimer.

(21) Appl. No.: 11/595,346

(22) Filed: Nov. 9, 2006

(65) Prior Publication Data

US 2008/0113640 A1    May 15, 2008

(51) Int. Cl.
*H04J 3/00* (2006.01)
*H04B 7/00* (2006.01)

(52) U.S. Cl. ....... 370/328; 370/336; 370/345; 455/41.2; 455/509

(58) Field of Classification Search ............... 455/42, 455/41.2–41.3, 507, 517, 552.1–553.1; 370/312, 370/328–330, 336–337, 343–349, 432, 442, 370/470–471, 473, 475
See application file for complete search history.

(56) References Cited

U.S. PATENT DOCUMENTS

| | | | |
|---|---|---|---|
| 5,574,979 A | 11/1996 | West | |
| 6,819,661 B2 | 11/2004 | Okajima et al. | |
| 6,907,044 B1 | 6/2005 | Yonge, III et al. | |
| 7,039,358 B1 * | 5/2006 | Shellhammer et al. | 455/41.2 |
| 7,450,489 B2 * | 11/2008 | Sandhu | 370/204 |
| 7,502,383 B2 * | 3/2009 | Ginzburg et al. | 370/448 |
| 7,643,570 B2 * | 1/2010 | Seki | 375/267 |
| 2002/0061031 A1 | 5/2002 | Sugar et al. | |
| 2003/0161282 A1 | 8/2003 | Medvedev et al. | |
| 2004/0028155 A1 | 2/2004 | Dornstetter et al. | |
| 2004/0100941 A1 | 5/2004 | Lim et al. | |
| 2004/0125777 A1 * | 7/2004 | Doyle et al. | 370/338 |
| 2004/0136349 A1 * | 7/2004 | Walton et al. | 370/338 |
| 2005/0111419 A1 | 5/2005 | Kwon et al. | |
| 2005/0135295 A1 * | 6/2005 | Walton et al. | 370/328 |
| 2005/0226173 A1 * | 10/2005 | Strawczynski et al. | 370/278 |
| 2006/0050718 A1 | 3/2006 | Corson et al. | |

(Continued)

FOREIGN PATENT DOCUMENTS

CN        1717900 A    1/2006

(Continued)

*Primary Examiner* — Simon D Nguyen
(74) *Attorney, Agent, or Firm* — Garlick & Markison; Bruce E. Garlick

(57) ABSTRACT

A wireless network infrastructure supporting a plurality of wireless end point devices containing a wireless access point and a plurality of end point wireless devices that supports single transmission and reception and/or concurrent interfering transmission and reception. The wireless access point transmits data to the end point wireless devices that supports single transmission and reception during a first portion of a first data transmission period and simultaneously transmits data to the end point wireless devices that supports concurrent interfering transmission and reception during a second portion of the first data transmission period. The wireless access point simultaneously receives data from the end point wireless devices that supports concurrent interfering transmission and reception during a second data transmission period. The wireless access point detects and separates data that arrive from the Plurality of end point wireless devices that supports concurrent interfering transmission and reception.

27 Claims, 9 Drawing Sheets

U.S. PATENT DOCUMENTS

| | | | |
|---|---|---|---|
| 2006/0084383 A1* | 4/2006 | Ibrahim et al. | 455/41.2 |
| 2006/0092888 A1 | 5/2006 | Jeong et al. | |
| 2006/0133273 A1 | 6/2006 | Julian et al. | |
| 2006/0135075 A1 | 6/2006 | Tee et al. | |
| 2007/0054625 A1 | 3/2007 | Beale | |
| 2007/0281617 A1 | 12/2007 | Meylan et al. | |
| 2008/0112358 A1* | 5/2008 | Bennett | 370/329 |

FOREIGN PATENT DOCUMENTS

KR  1020060063702 A  6/2006

* cited by examiner

ADAPTIVE NETWORK SUPPORTING SINGLE TO CONCURRENT INTERFERING WIRELESS TRANSMISSIONS

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

This invention generally relates to wireless communication infrastructures, and, more particularly, to wireless access points in a packet switched communication network.

2. Related Art

Wireless access points are in widespread use, both in public places and private areas, because of the mobility that end point wireless devices provide. Packet switched communication infrastructures include wireless local area networks that essentially contain wireless access points and end point wireless devices. End point wireless devices include personal or laptop computers, servers, set top boxes and handheld data/communication devices, for example. Often a plurality of wireless access points are bridged to provide additional coverage area. The communication between wireless access points and the end point wireless devices occur on the basis of predefined sets of rules or protocols.

One of the major uses of such wireless local area networks is that availability of Internet in many private and public places, with out needing to be hooked up to a network with cables. In addition, in many public places the wireless Internet access is available free of cost. However, the wireless local area networks that contain wireless access points are often overloaded with the traffic patterns being irregular, this is especially true in public places. The overload depends on the number of users accessing the wireless local area networks, the bandwidth consumed by each user, and Quality Of Service (QOS) provided. When a wireless local area network is overloaded, it becomes slow and often the wireless local area networks breakdown under such conditions, causing inconvenience to the users.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the Claims.

In accordance with the present invention, a wireless network infrastructure supporting a plurality of wireless end point devices containing a wireless access point, first end point wireless device that supports single transmission and reception, second end point wireless device that supports concurrent interfering transmission and reception, and third end point wireless device that supports concurrent interfering transmission and reception. The wireless access point transmits data to the first end point wireless device during a first portion of a first data transmission period and simultaneously transmits data to the second end point wireless device and the third end point wireless device during a second portion of the first data transmission period.

In addition, the wireless access point simultaneously receives data from the second end point wireless device and third end point wireless device during a second data transmission period. The wireless access point detects and separates data that arrive from the second end point wireless device and third end point wireless device. The wireless access point uses digital signal processing algorithms to detect and separate data arriving from the second end point wireless device and third end point wireless device. The second end point wireless device detects and separates the data that is destined to the second end point device. Similarly, the third end point wireless device detects and separates the data that is destined to the third end point device. The wireless access point manages and arbitrates the first end point wireless device, second end point wireless device and third end point wireless device by using a protocol during a becon period, the first data transmission period and second data transmission period.

In accordance with the present invention, a wireless access point in a wireless network infrastructure that routes a plurality of packets between an Internet network and a plurality of end point wireless devices, including a wireless downstream transceiver circuitry, processing circuitry communicatively coupled to the wireless downstream transceiver circuitry. The wireless downstream transceiver circuitry further contains an adaptive transmitter and adaptive receiver. The processing circuitry concurrently communicates with the plurality of end point wireless devices and the wireless downstream transceiver circuitry transmits and receives data simultaneously.

The processing circuitry communicates concurrently by transmitting and receiving to end point wireless devices equipped with single transmission and reception during first portion of a data transmission period and by transmitting and receiving to end point wireless devices equipped with concurrent interfering transmission and reception simultaneously during a second portion of the data transmission period. The wireless access point also contains a downstream controller circuitry that manages and arbitrates the plurality of end point wireless devices by using a protocol during a becon period, the first data transmission period and second data transmission period.

Features and advantages of the present invention will become apparent from the following detailed description of the invention made with reference to the accompanying drawings.

DETAILED DESCRIPTION OF THE INVENTION

Figure 1:
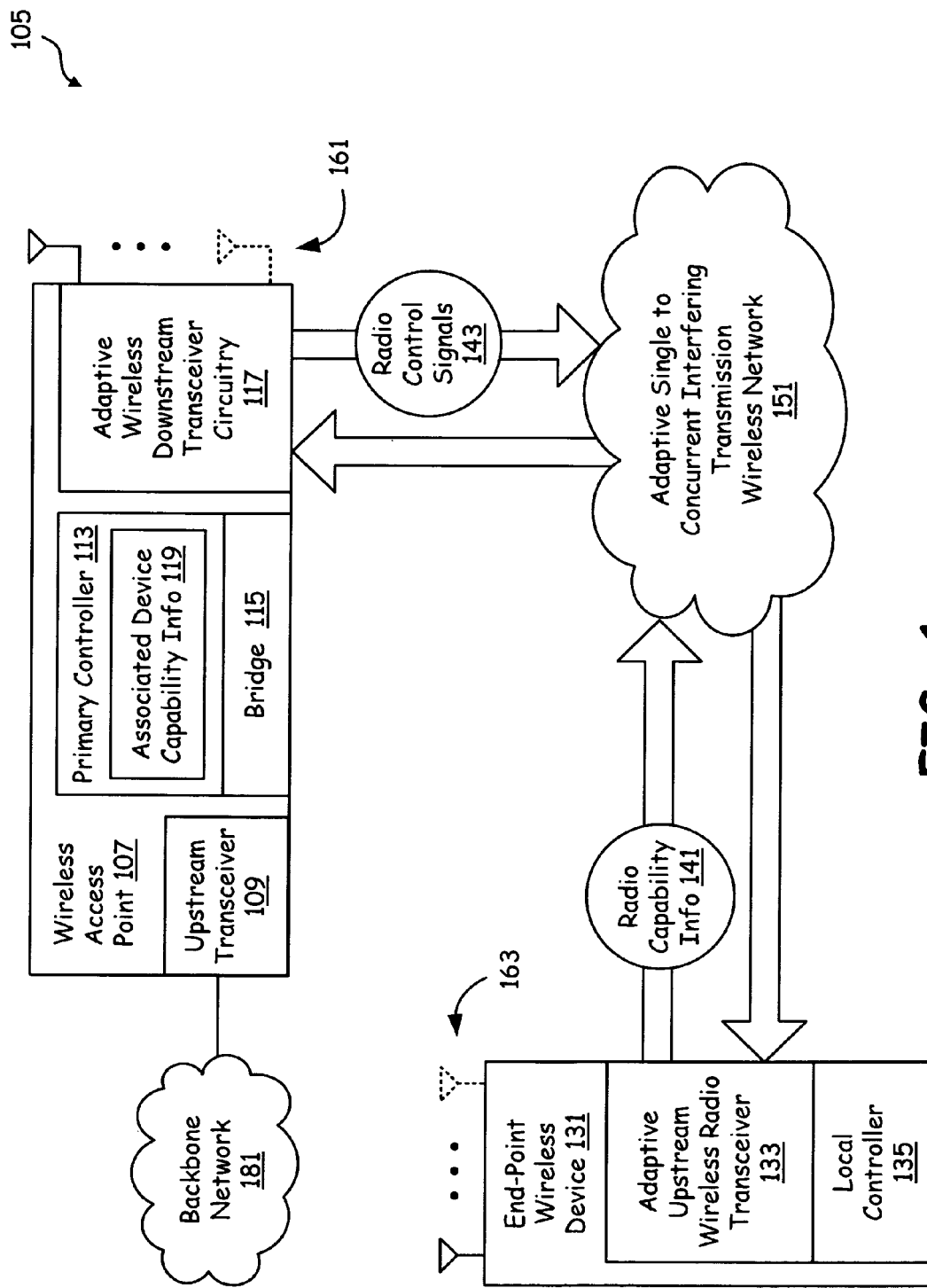
FIG. 1 is a schematic block diagram illustrating an embodiment of an adaptive single to concurrent interfering wireless network built in accordance with the present invention.

FIG. 1 is a schematic block diagram 105 illustrating an embodiment of an adaptive single to concurrent interfering wireless network 151 built in accordance with the present invention. In specific, a wireless access point 107, in an adaptive wireless network supports a plurality of end point wireless devices such as 131 that are equipped with adaptive upstream wireless radio transceivers such as 133 and also supports legacy single transmission capable wireless devices (described with reference to the FIG. 2). In other words, during one portion of a contention free data transmission period, the wireless access point 107 provides access to legacy end point wireless devices, while in another portion of the contention free data transmission period, the access point 107 provides concurrent interfering transmission and reception to a plurality of end point wireless devices such as 131, that are equipped with adaptive upstream wireless radio transceivers 133 (that is, concurrent interfering transmission capable devices). Similarly, during contention period, the wireless access point 107 provides access to both single transmission capable devices and concurrent interfering transmission capable devices based upon contention and arbitration, during separate potions of the period.

The wireless end point devices are managed by using a control becon that originate from the access point 107, during a becon period. That is, the access point delivers contention information during a beacon period of the frame. The access point 107 adapts as needed to support new associations of end point wireless devices. In other words, based on interaction with the plurality of end point wireless devices such as 131, the wireless access point adapts a frame contention of a wireless local area network protocol to accommodate each of the plurality of end point wireless devices. In addition, the access point 107 and concurrent interfering transmission capable end point devices such as 131 perform transmission via a plurality of radio channels supported by a plurality of antennas such as 161 and 163 and multiple tuners (as described with reference to the FIG. 3).

Wireless access point 107 is a routing device that routes a plurality of packets between a backbone network 181 and end point wireless devices such as 131. The wireless access point 107 contains adaptive wireless downstream transceiver circuitry 117 that transmits and receives control signals and data using radio channels (that is, the physical layer), utilizing multiple tuners and antennas 161 built into the wireless access point 107. A primary controller 113 generates control signals 143 that manage end point wireless devices associated with the access point 107. These control signals 143 are transmitted to the end point wireless devices during a becon period that allow the end point wireless devices to synchronize their transmission and reception with the access point 107.

In addition, the control signals 143 provide arbitration to the contentions during a contention period, the contention being placed by legacy single transmission capable devices. The concurrent interfering transmission capable devices, on the contrary, are able to access the wireless access point 107, during contention period or contention free period, concurrently. This concurrent transmission involves an overlapping time period in which transmission occurs from a plurality of concurrent interfering transmission capable devices, for example using code division technology. Similarly, concurrent transmission may also involve single transmission capable devices transmitting simultaneously, using time division technology, for example. The primary controller 113 also determines if it is beneficial, in terms of overall data rate efficiency, to provide access in a concurrent interfering mode or in a single mode, to the devices that are equipped with both single and concurrent interfering transmission capabilities, since the overhead associated with the concurrent interfering transmissions may slow down the overall bandwidth efficiency when the load is low. The load is typically determined by the number of end point wireless devices associated with the access point 107, the bandwidth each of these devices utilize and quality of service provided. Then, such a decision is transmitted to the end point wireless devices using control signals 143, during a becon period. A bridge circuitry 115 provides the access point 107 with the ability to bridge with other wireless access points as well as bridge with backbone network 181 via an upstream transceiver 109.

The end point wireless device 131 also contains the adaptive upstream wireless radio transceiver 133 that transmits and receives control signals and data in a physical layer, utilizing multiple tuners and antennas 163 built into the end point wireless device 131. An adaptive transmission involves, using an adaptive protocol to switch between single transmission and concurrent interfering transmission, managing an access point. That is, a wireless network uses an adaptive protocol which can adapt between supporting only single transmission capable devices to managing only concurrent interfering transmission capable devices, or anything in between, with in a given frame. For example, anything in between may mean the protocol supporting single transmission capable devices transmitting simultaneously to the access point during a portion of the frame. Adapting a frame may also involve using many different protocols and/or multiple types of radios to accommodate various types of wireless end point devices such as concurrent interfering transmission capable devices, single transmission capable devices, devices having single or multiple radios (with multiple antennas) or any combination of these end point devices. For example, a transceiver in an end point device may utilize multiple radios with multiple antennas, and may contain both single transmissions transceiver and concurrent interfering transmissions transceiver.

A local controller 135 manages the functionality of the end point wireless device 131, among which is generating radio capability information 141 and transmitting it to the access point 107 during a becon period. The access point 107 stores such information in storage, that is, associated device capability information 119, and utilizes this information while managing the end point wireless devices.

In one embodiment, the receivers at the end point wireless devices may be simple in design and the receiver at the access point may be complex. For example, the wireless access point may only support concurrent interfering reception and time division technology transmission. That is, the wireless access point transmits a single transmission during a first portion of a frame and delivers multiple transmissions during a second portion of the frame. When the wireless access transmits concurrent interfering transmissions, a corresponding end point device receives all of the concurrently transmitted data and extracts the data that is destined for it. In another embodiment, the end point device may extracts the data destined for it and at least a portion of the data destined for another end point device.

Figure 2:
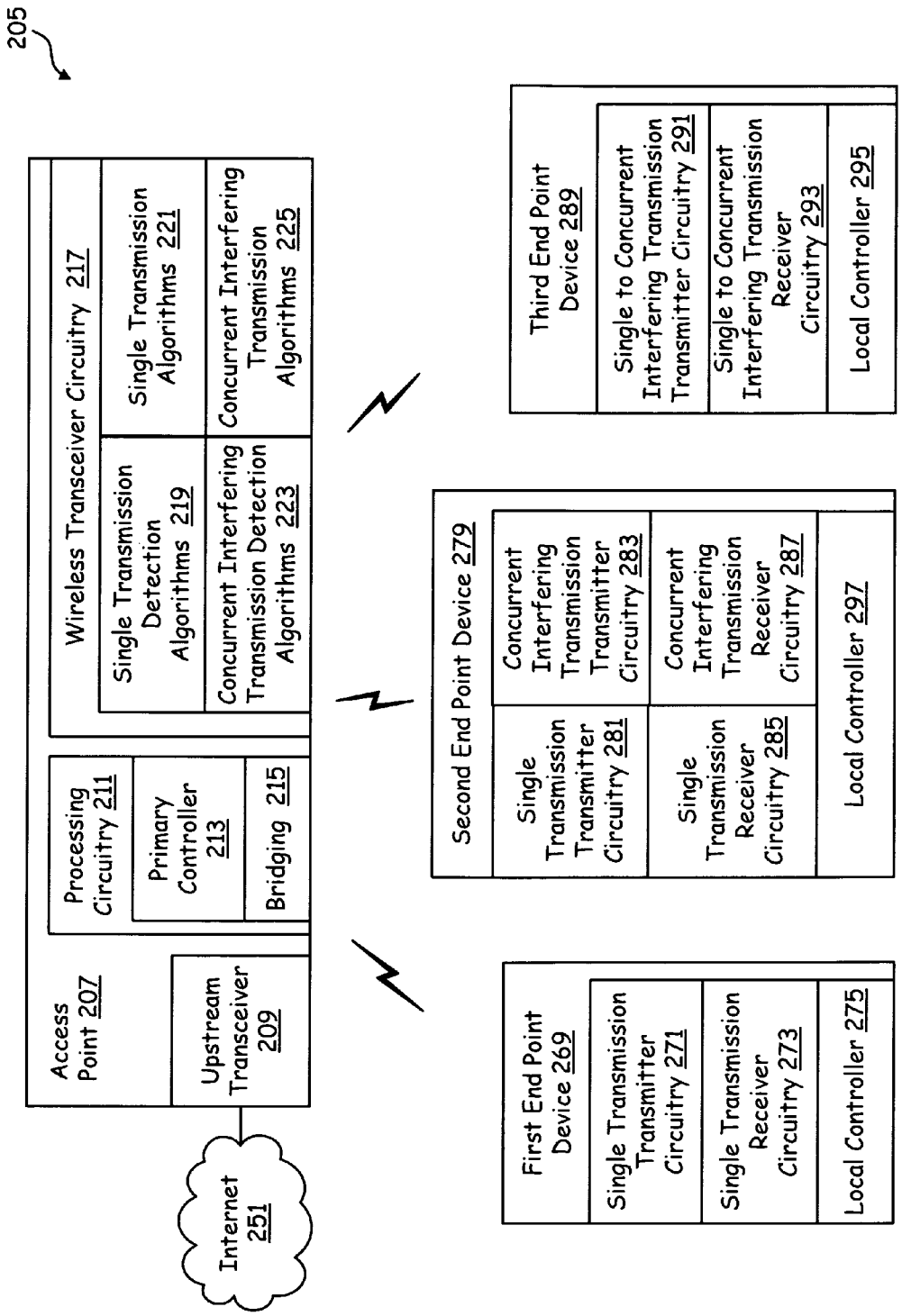
FIG. 2 is a schematic block diagram illustrating an embodiment of a wireless network infrastructure built in accordance with the present invention, wherein an access point provides concurrent interfering access to a plurality of wireless devices.

FIG. 2 is a schematic block diagram illustrating an embodiment of a wireless network infrastructure 205 built in accordance with the present invention, wherein an access point 207 provides concurrent interfering access to a plurality of wireless devices. Specifically, the wireless access point 207 provides access to a variety of end point wireless devices such as a first wireless device 269, second wireless device 279, and third wireless device 289, that are equipped with single transmission transceivers, concurrent interfering transmission transceivers or single to concurrent interfering transceivers.

The first wireless device 269 is equipped with single transmission transmitter circuitry 271 and single transmission receiver circuitry 273 (that is, single transmission capable devices) that does not allow concurrent interfering transmission. Therefore, the wireless access point 207 allocates a portion of contention free period to wireless devices that are only equipped with single transmission transmitter circuitries and single transmission receiver circuitries. During this period, neither the access point 207 nor wireless devices equipped with concurrent interfering transmission perform concurrent interfering transmissions or receptions. Similarly, during contention period, the wireless access point 207 provides access to all of the single transmission capable devices depending on contention from the wireless devices and arbitration, during separate potions of the period.

The second wireless device 279 is equipped with single transmission transmitter circuitry 281, single transmission receiver circuitry 285, concurrent interfering transmission transmitter circuitry 283, concurrent interfering transmission receiver circuitry 287 (that is, concurrent interfering transmission capable devices). These transceivers are capable of performing both single transmission and receptions, and concurrent interfering transmission and receptions. The wireless access point 207 allocates one portion of contention free period to wireless devices that are equipped with both single transmission transceivers and concurrent interfering transmission transceivers, so that depending upon load conditions single or concurrent interfering transmissions and receptions may be performed. In addition, during a contention period, the wireless access point 207 provides access to the plurality of concurrent interfering transmission capable devices bandwidth depending on contention from the wireless devices and arbitration, during separate potions of the period. Again, load factors and efficiency determine the arbitration.

The third wireless device 289 is equipped single to concurrent interfering transmission transmitter circuitry 291 and single to concurrent interfering transmission receiver circuitry 293. This type of device may access the wireless access point 207 individually, but are capable of simultaneously communicating with a plurality of devices, including a plurality of wireless access points.

The wireless access point 207 achieve concurrent interfering transmission and reception by utilizing the built in radio frequency components (described with reference to the FIG. 3) and software components, which are part of a wireless transceiver circuitry 217. The software components include digital signal processing codes that assist in detecting and processing the data received via single or concurrent interfering transmission and reception. Digital signal processing codes include single transmission detection algorithm 219 and single transmission algorithms 221, which assist in processing the data received from the single transmission capable devices such as 269. Similarly, concurrent interfering transmission detection algorithms 223 and concurrent interfering transmission algorithms 225 assist in processing the data received from the concurrent interfering transmission capable devices such as 279.

The primary controller 213 determines the load conditions and factors in the benefits of allocating concurrent interfering transmissions and receptions. Then, if it is found to be beneficial to provide access in concurrent interfering mode, the access point 207 does so with the devices equipped with concurrent interfering transceivers. The benefits are determined based upon the overhead associated with the concurrent interfering transmissions that may slow down the overall bandwidth efficiency when the load is low. The load is typically determined by the number of end point wireless devices associated with the access point 207, the bandwidth each of these devices utilize and quality of service provided. Such decisions are transmitted to the wireless devices using becon signals, during a becon period.

Becon signals generated by a primary controller 213 of processing circuitry 211 control the aspects of transmission and reception such as mode of transmission, contention free period accesses, and contention period arbitrations. All associated wireless devices listen to becon signals generated by the wireless access point 207 and plan their communication accordingly. A bridge circuitry 215 provides the access point 107 with ability to bridge with other wireless access points as well as bridge with backbone network 251 via an upstream transceiver 209. The wireless access point 207 and the concurrent interfering transmission capable wireless devices such as 279 and 289 may have a plurality of antennas and a plurality of tuners (described with reference to the FIGS. 3 and 4), thus being capable of communicating in more than one radio channel. In addition, local controllers 275, 297 and 295 manage functionality of the wireless devices 269, 279 and 289, respectively. The functionality of wireless devices 269, 279 and 289 include generating radio capability information and transmitting it to the access point during a becon period.

Figure 3:
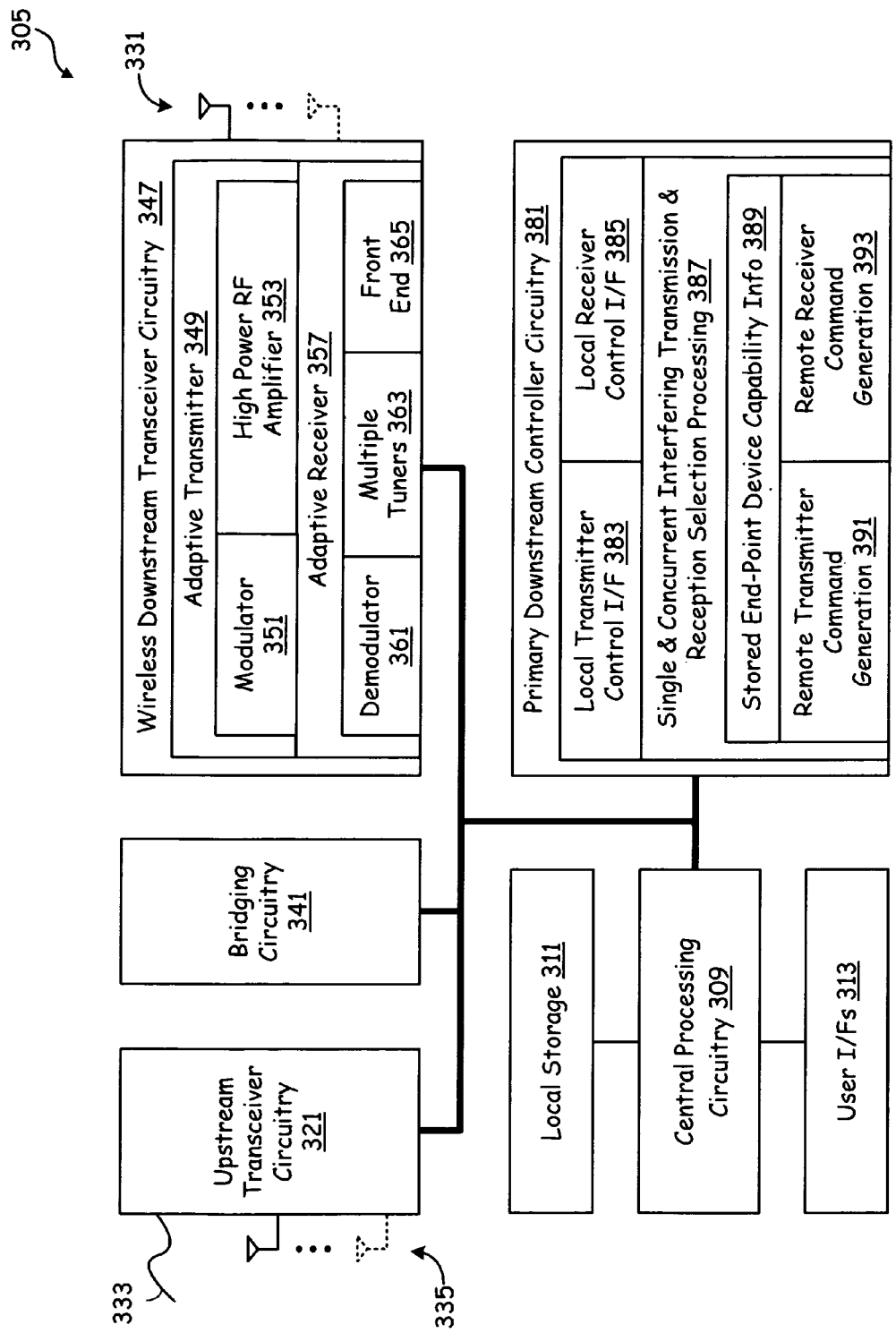
FIG. 3 is a schematic block diagram illustrating an access point constructed in accordance with the embodiment of FIGS. 1 and 2 of the present invention.

FIG. 3 is a schematic block diagram illustrating an access point 305 constructed in accordance with the embodiment of FIGS. 1 and 2 of the present invention. The circuitry 305 may represent any of the wireless access points that route data packets. The access point circuitry 305 generally includes central processing circuitry 309, local storage 311, user interfaces 313, upstream transceiver circuitry 321, bridging circuitry 341, wireless downstream transceiver circuitry 347, and primary downstream controller circuitry 381. These components communicatively coupled to one another via one or more of a system bus, dedicated communication pathways, or other direct or indirect communication pathways.

The central processing circuitry 309 may be, in various embodiments, a microprocessor, a digital signal processor, a state machine, an application specific integrated circuit, a field programming gate array, or other processing circuitry. In addition, in various embodiments, the primary downstream controller circuitry 381 may be a controller card or part of access point circuitry card containing a microcontroller or microprocessor.

Local storage 311 may be random access memory, read-only memory, flash memory, a disk drive, an optical drive, or another type of memory that is operable to store computer instructions and data. The local storage 311 contains software components (not shown) that process received data in cases of both single transmission capable devices such as 269 of FIG. 2 and concurrent interfering transmission capable devices such as 279 of FIG. 2. These software components utilize digital signal processing (information processing) techniques to provide concurrent interfering access to a plurality of concurrent interfering transmission capable devices, when the load at the access point become high and the efficiency goes below a certain level. The software components include single transmission detection algorithm, single transmission algorithms, which assist in processing the data received from the single transmission capable devices and concurrent interfering transmission detection algorithms and concurrent interfering transmission algorithms which assist in processing the data received from the concurrent interfering transmission capable devices.

The decisions regarding accesses in various modes during both contention period and contention free period are transmitted to the single transmission capable devices and concurrent interfering transmission capable devices during a becon period, by the primary downstream controller circuitry 381. The access modes include both single transmission mode and concurrent interfering transmission mode, and the decision to provide access in any mode depends primarily on the wireless device capability and the load conditions. The becon signals are generated by remote transmitter command generation 391 and remote receiver command generation 393. These components 391 and 393 utilize stored end-point device capability information 389 to generate the becon signals. The becon signals control the aspects of end point wireless devices that include mode of transmission, contention free period accesses, and contention period arbitrations. All associated wireless devices listen to becon signals and plan their communication accordingly. The stored end-point device capability information 389, remote transmitter command generation 391 and remote receiver command generation 393 components are part of single and concurrent interfering transmission and reception selection processing 387, which is altogether responsible for coordinating and communicating becon signals to the remote wireless devices. In addition, the primary downstream controller circuitry 381 contains local transmitter control interfaces 383 and local receiver control interfaces 385 that allow the primary downstream controller circuitry 381 to interface with rest of the access point circuitry, specifically, the wireless downstream transceiver circuitry 347.

The wireless access point circuitry 305 also contains the wireless downstream transceiver circuitry 347, which is equipped with an adaptive transmitter 349 and adaptive receiver 357 to handle the physical layer of protocol. The wireless downstream transceiver circuitry 347 is capable of performing both single transmission and receptions, and concurrent interfering transmission and receptions. The adaptive transmitter 349 contains a modulator 351 and high power radio frequency (RF) amplifier 353 that are capable of modulating digital data and transmit wirelessly within a local region. The adaptive receiver 357 contains a front end receiver 365, multiple tuners 363, and one or more demodulators such as 361. The wireless downstream transceiver circuitry 347 is communicatively coupled to a plurality of antennas (an antenna array) 331 that together with multiple tuners 363 and demodulators 361 help communicate in multiple radio channels and a wider bandwidth. The front end receiver 365 contains low noise RF amplifiers and down-converters. In one embodiment, the software information processing components mentioned above with regards to the local storage 311 (that is, single transmission detection algorithm, single transmission algorithms, concurrent interfering transmission detection algorithms and concurrent interfering transmission algorithms) may also exist in the storage of wireless downstream transceiver circuitry 347, to facilitate faster processing.

A bridge circuitry 341 allows bridging of the access point 305 with other wireless access points as well as bridge with a backbone network via an upstream transceiver 321. The upstream transceiver circuitry 321 contains wired and wireless packet switched interfaces that provides the access point 305 ability to communicatively couple with a backbone network such as Internet, and is connected to a plurality of antennas 335 as well as a wire 333 that communicatively couples to the backbone network. In other embodiments, the access point 305 of the present invention may include fewer or more components than are illustrated as well as lesser or further functionality. In other words, the illustrated wireless device is meant to merely offer one example of possible functionality and construction in accordance with the present invention.

Figure 4:
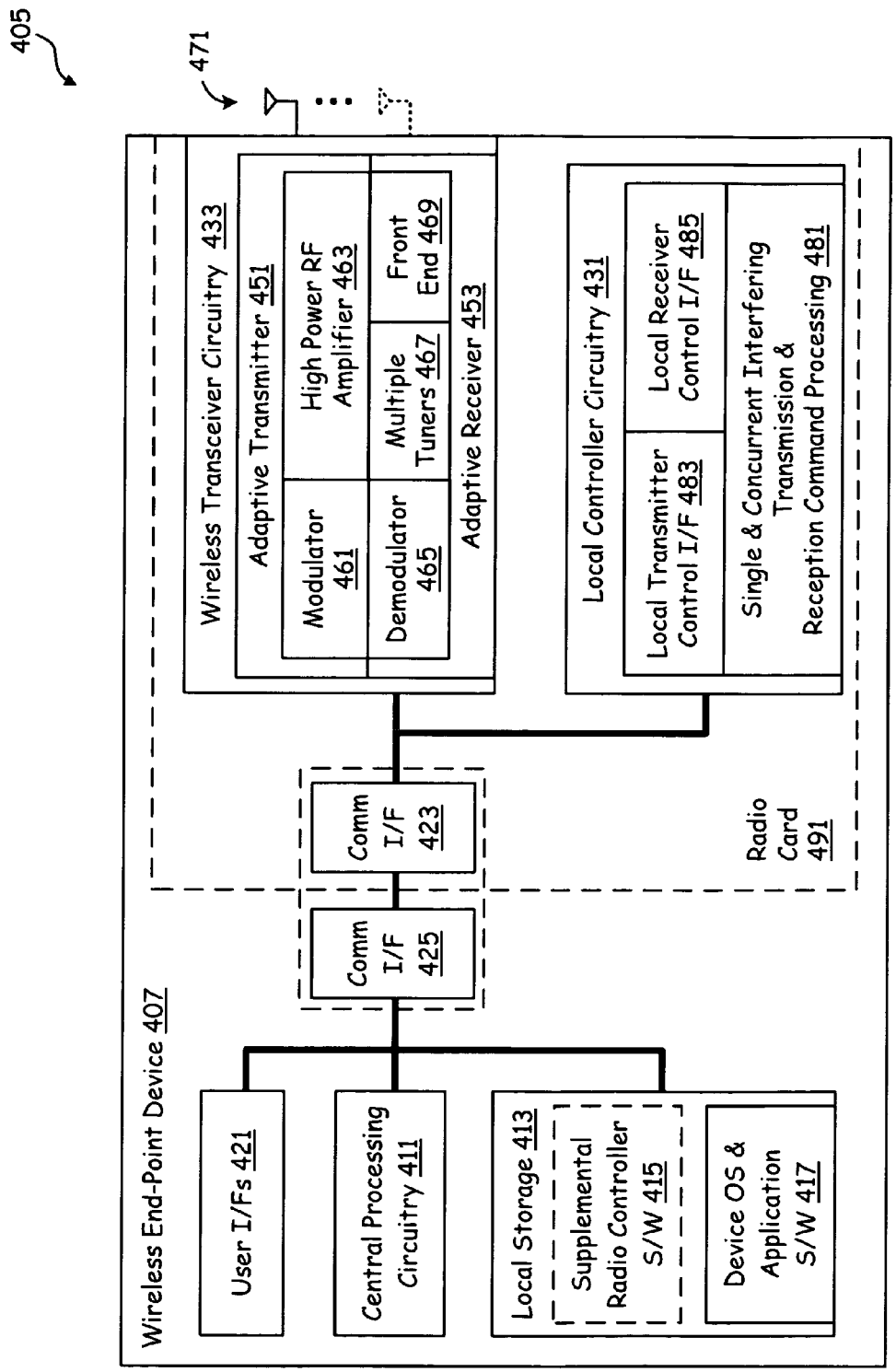
FIG. 4 is a schematic block diagram illustrating a wireless end point device constructed in accordance with the embodiment of FIGS. 1 and 2 of the present invention.

FIG. 4 is a schematic block diagram 405 illustrating a wireless end point device 407 constructed in accordance with the embodiment of FIGS. 1 and 2 of the present invention. The circuitry 407 may represent any of the wireless end point devices from which packets originate or within which packets terminate and may represent any of the concurrent interfering transmission capable wireless end point devices of FIGS. 1 and 2. The wireless end point device 407 generally includes central processing circuitry 411, local storage 413, user interfaces 421, radio card 491, and communication interfaces 425. These components communicatively coupled to one another via one or more of a system bus, dedicated communication pathways, or other direct or indirect communication pathways.

The central processing circuitry 411 may be, in various embodiments, a microprocessor, a digital signal processor, a state machine, an application specific integrated circuit, a field programming gate array, or other processing circuitry. In addition, in various embodiments, the radio card 491 may consist of a controller containing a microcontroller or microprocessor. Local storage 413 may be random access memory, read-only memory, flash memory, a disk drive, an optical drive, or another type of memory that is operable to store computer instructions and data. The local storage 413 contains device operating system and application software 417 and optionally supplemental radio controller software 415. The communication interface 425 allows the wireless end point device 407 to interface with the radio card 491.

The radio card 491 contains a local controller circuitry 431, which in addition contains a local transmitter control interface 483, local receiver control interface 485 and single and concurrent interfering transmission and reception command processing 481. The local controller circuitry 431 manages control functionality of wireless transceiver circuitry 433. The control functionality of the wireless transceiver circuitry 433 include generating radio capability information and transmitting it to the access point during a becon period as well as receiving the control signals from an associated access point, interpreting it and plan communication accordingly. A communication interface 423 of the radio card 491 allows communication with the rest of the wireless end point device circuitries.

The radio card 491 also contains the wireless transceiver circuitry 433, which is equipped with an adaptive transmitter 451 and adaptive receiver 453. The wireless transceiver circuitry 433 is capable of performing both single transmission and receptions, and concurrent interfering transmission and receptions. The adaptive transmitter 451 contains a modulator 461 and high power radio frequency (RF) amplifier 463 that are capable of modulating digital data and transmit wirelessly to communicatively couple with the access point. The adaptive receiver 453 contains a front end receiver 469, multiple tuners 467, and one or more demodulators such as 465. The wireless transceiver circuitry 433 is communicatively coupled to a plurality of antennas (an antenna array) 471 that together with multiple tuners 467 and demodulators 465 help communicate in multiple radio channels and a wider bandwidth. The front end receiver 469 contains low noise RF amplifiers and down-converters. The radio card 491 also contains software information processing modules (not shown), such as single transmission detection algorithm, single transmission algorithms, concurrent interfering transmission detection algorithms and concurrent interfering transmission algorithms, to facilitate concurrent interfering transmission and reception.

In other embodiments, the wireless end point device circuitry 407 of the present invention may include fewer or more components than are illustrated as well as lesser or further functionality. In other words, the illustrated wireless device is meant to merely offer one example of possible functionality and construction in accordance with the present invention.

Figure 5:
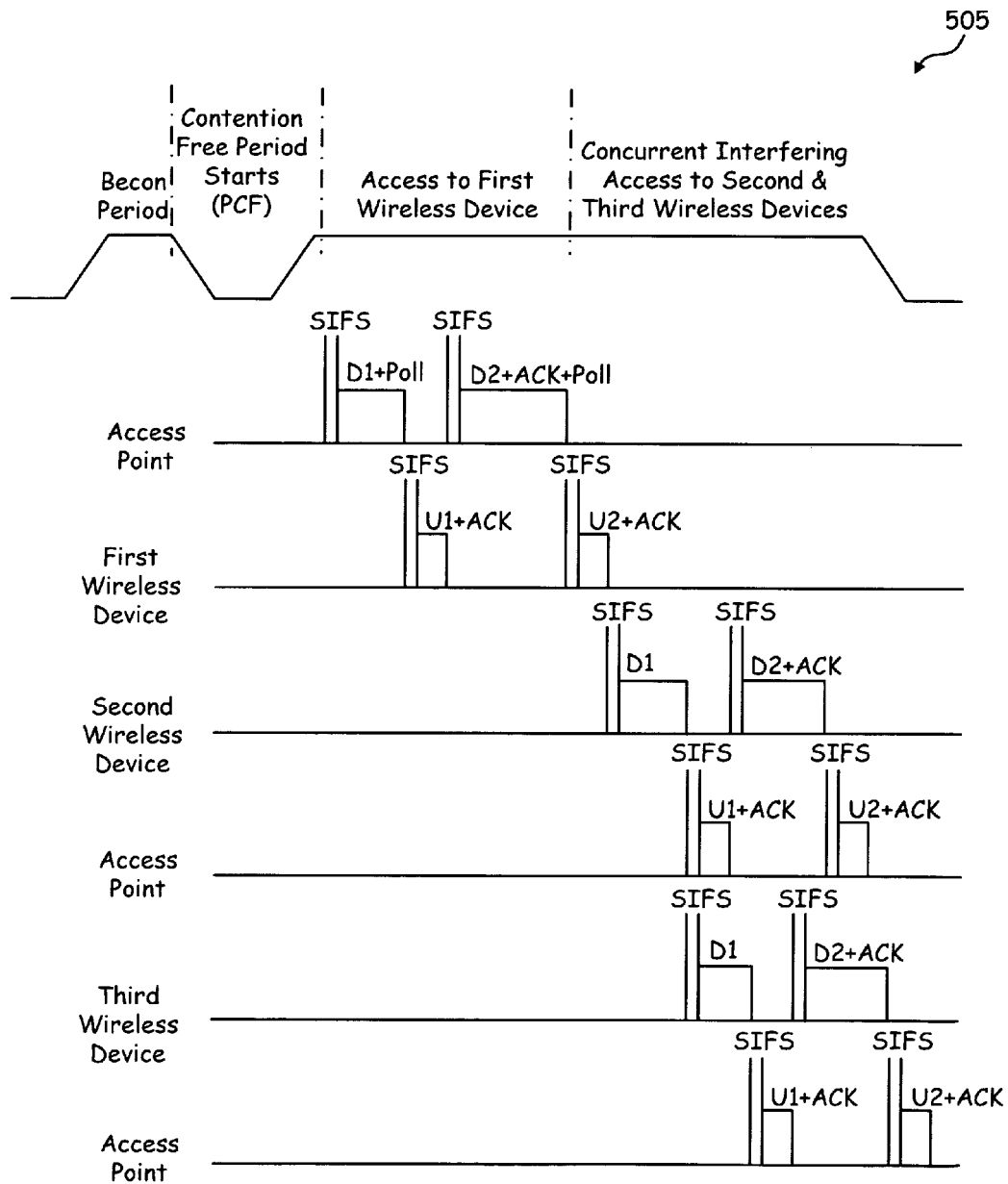
FIG. 5 is an exemplary timing diagram illustrating single access to single transmission capable devices and concurrent interfering access to concurrent interfering access capable devices during a contention free period, in the embodiment of FIG. 2.

FIG. 5 is an exemplary timing diagram 505 illustrating single access to single transmission capable devices and concurrent interfering access to concurrent interfering access capable devices during a contention free period, in the embodiment of FIG. 2. As illustrated, a becon period precedes the contention free period. The becon signals that determine the accesses to wireless access point in various modes during contention free period are transmitted to the single transmission capable devices and concurrent interfering transmission capable devices during the becon period. The access modes include both single transmission mode and concurrent interfering transmission mode, and the decision to provide access in any mode depends primarily on the wireless device capability and the load conditions. The becon signals control the aspects of end point wireless devices that include mode of transmission, contention free period accesses, and contention period arbitrations. All associated wireless end point devices respond to the becon signals and plan their communication accordingly. Following becon period, the contention free period begins by providing a portion of the period for single transmission capable devices (single transmission portion) and another portion for concurrent interfering transmission capable devices (concurrent interfering transmission portion).

During the single transmission portion of the contention free period, the access point senses channel being idle for a short duration, that is, SIFS (Short Inter Frame Space) and begins to transmit data to the single transmission capable wireless devices, such as the first wireless device 269 of FIG. 2, or concurrent interfering transmission capable devices such as the second wireless device 279 of FIG. 2, in single transmission mode. The data transmission to the single transmission capable wireless devices is based upon polling and acknowledgement after transfer of data, as illustrated. Similar considerations apply for transmission of data from the single transmission capable wireless devices to the access point.

Similarly, during the concurrent interfering transmission portion, the concurrent interfering transmission capable devices, such as the 279 or 289 of FIG. 2, sense the channel being idle for a SIFS duration and transmit data to the access point. The data transmission from the concurrent interfering transmission capable wireless devices is based upon acknowledgement after transfer of data, as illustrated. Similar considerations apply for transmission of data from the access point to the concurrent interfering transmission capable wireless devices.

Figure 6:
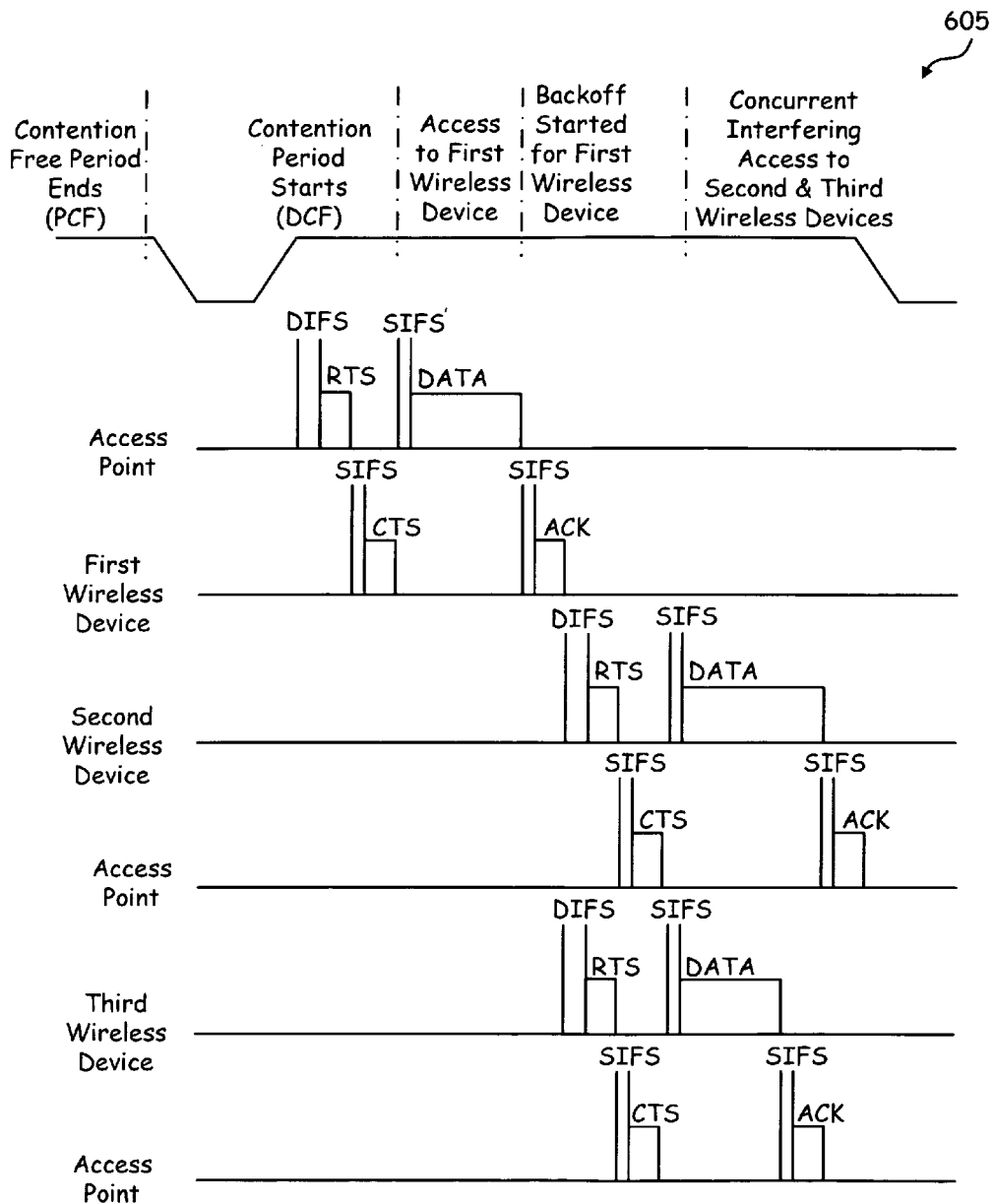
FIG. 6 is an exemplary timing diagram illustrating single access to single transmission capable devices and concurrent interfering access to concurrent interfering access capable devices during a contention period, in the embodiment of FIG. 2.

FIG. 6 is an exemplary timing diagram 605 illustrating single access to single transmission capable devices and concurrent interfering access to concurrent interfering access capable devices during a contention period, in the embodiment of FIG. 2. During single transmission portion of the contention period, the access point senses DIFS (Distributed Coordination Function Inter Frame Space) and transmits RTS (Request To Send) signal. After a SIFS (Short Inter Frame Space), the corresponding single transmission capable device (such as the first wireless device 269 of FIG. 2, or a concurrent interfering transmission capable device such as the second or third wireless device 279 or 289 of FIG. 2, in single transmission mode) respond by sending a CTS (Clear To Send) signal. Then, after a SIFS, the wireless access point sends data and receives ACK (acknowledgement) in response. Any contention during single transmission portion of the contention period is arbitrated on the basis of priorities.

Then, during concurrent interfering transmission portion of the contention period, the concurrent interfering transmission capable end point wireless devices (such as the second or third wireless device 279 or 289 of FIG. 2, in concurrent interfering transmission mode) sense DIFS and transmits RTS signal. After a SIFS, the wireless access point responds by sending a CTS signal. Again, after a SIFS, the concurrent interfering transmission capable end point wireless devices send data and receive ACK in response.

Figure 7:
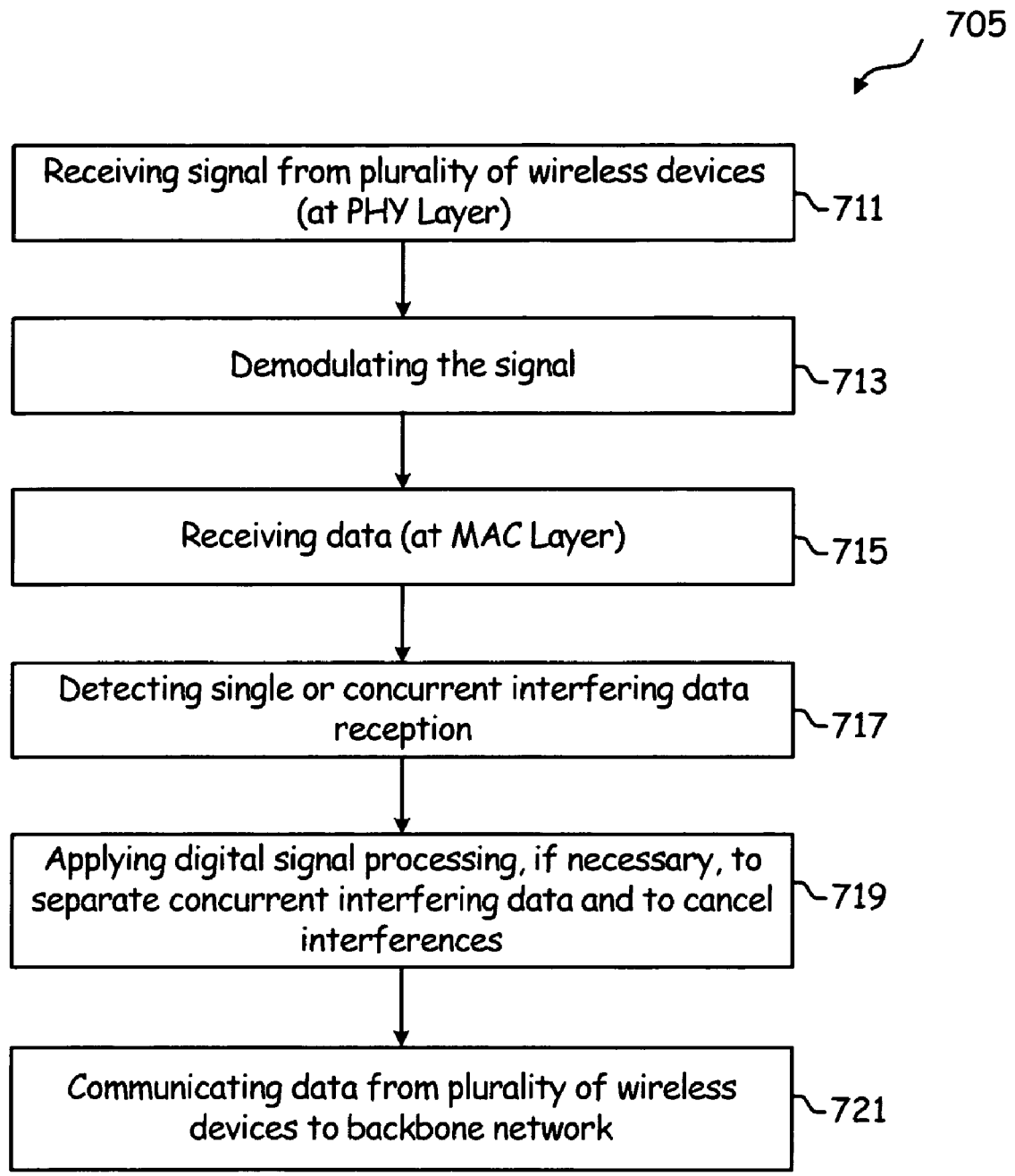
FIG. 7 is a flowchart illustrating general flow 705 of functionality of access point of FIG. 1, during concurrent interfering transmission and reception from a plurality of concurrent interfering transmission capable devices.

FIG. 7 is a flowchart illustrating general flow 705 of functionality of access point of FIG. 1, during concurrent interfering transmission reception from a plurality of concurrent interfering transmission capable devices. At a block 711, at a physical (PHY) layer, the wireless access point receives signals from a plurality of wireless devices. Then, at a next block 713, the wireless access point demodulates the signals received from a single or multiple tuners. At a next block 715, the wireless access point receives data at Multiple Access Control (MAC) layer.

At a next block 717, the wireless access point detects concurrent interfering data reception. Then, at a next block 719, the wireless access point applies digital signal processing algorithms to separate simultaneously received data from the plurality of concurrent interfering transmission capable end point wireless devices and to cancel any interferences. At a next block 721, the wireless access point communicates the data from the plurality of concurrent interfering transmission capable end point wireless devices to the backbone network.

Figure 8:
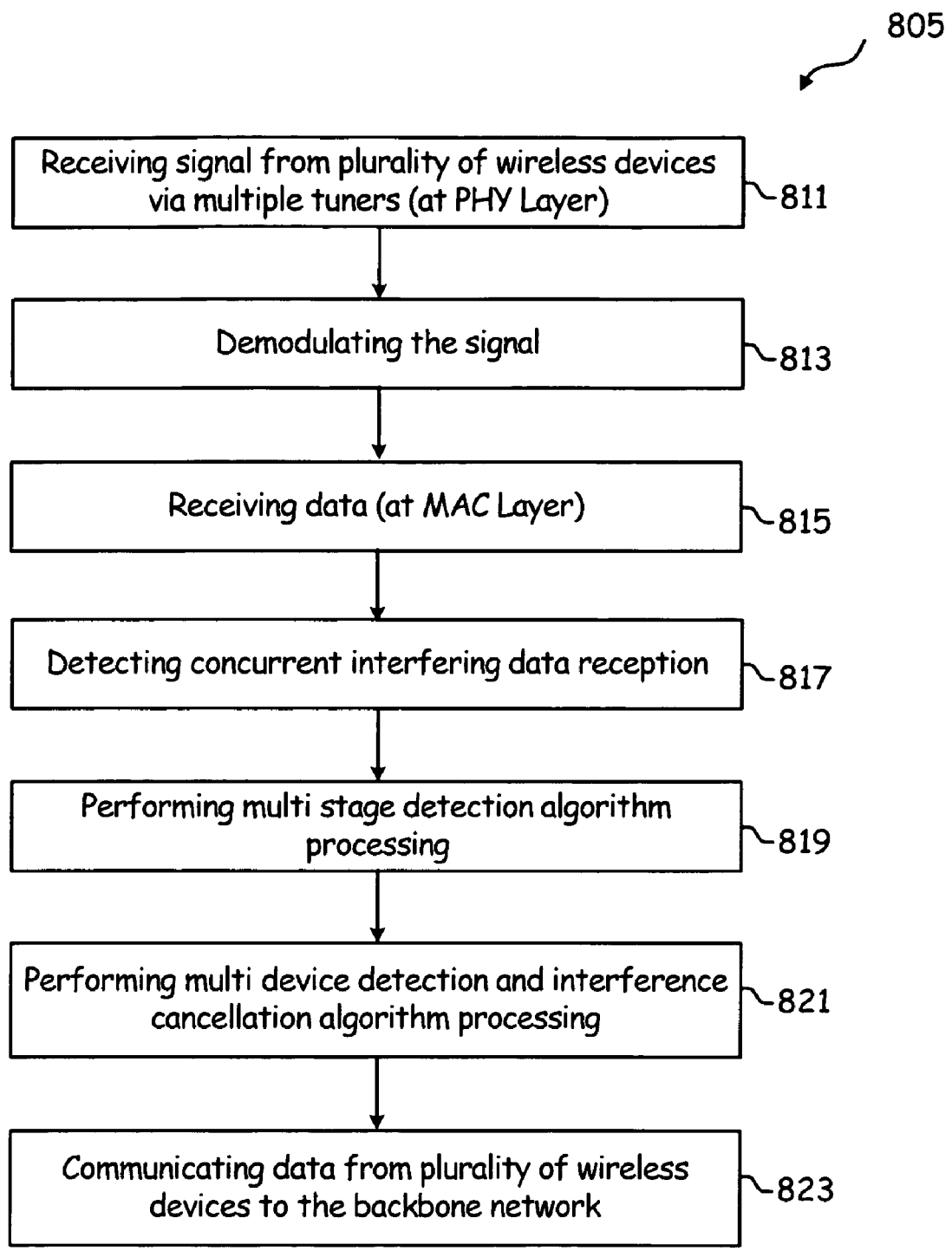
FIG. 8 is a flowchart illustrating flow of functionality of access point of FIG. 1, during concurrent interfering transmission reception from a plurality of concurrent interfering transmission capable devices, in detail.

FIG. 8 is a flowchart illustrating flow of functionality 805 of access point of FIG. 1, during concurrent interfering transmission reception from a plurality of concurrent interfering transmission capable devices, in detail. At a block 811, the wireless access point receives signals from a plurality of wireless devices (at a physical layer), via multiple tuners and multiple radio channels. Then, at a next block 813, the wireless access point demodulates the signals received from a single or multiple tuners. At a next block 815, the wireless access point receives data at MAC layer.

At a next block 817, the wireless access point detects concurrent interfering data reception. Then, at a next block 819, the wireless access point performs multi stage detection algorithm processing. At a next block 821, the wireless access point performs multi device detection and interference cancellation algorithm processing. By this, the wireless access point separates simultaneously received data from the plurality of concurrent interfering transmission capable end point wireless devices and takes measures against any interference. At a next block 823, the wireless access point communicates the data from the plurality of concurrent interfering transmission capable end point wireless devices to the backbone network.

Figure 9:
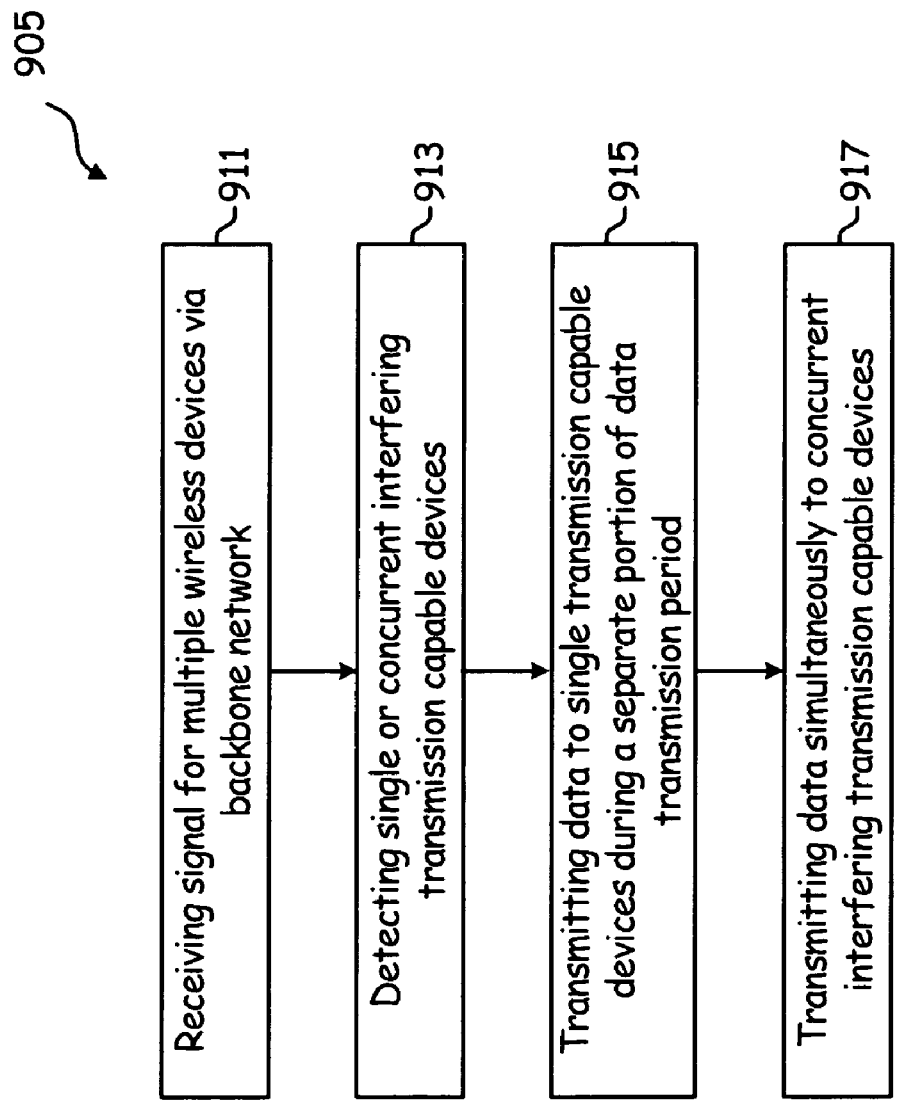
FIG. 9 is a flowchart illustrating general flow of functionality of access point of FIG. 1, during concurrent interfering transmission to a plurality of concurrent interfering transmission capable devices.

FIG. 9 is a flowchart illustrating general flow of functionality of access point of FIG. 1, during concurrent interfering transmission to a plurality of concurrent interfering transmission capable devices. At a block 911, the wireless access point receives signals from a backbone network, destined for a plurality of concurrent interfering transmission capable wireless devices. At a next block 913, the wireless access point detects single transmission capable devices and concurrent interfering transmission capable devices, during a becon period.

Then, at a next block 915, the wireless access point transmits data wirelessly to single transmission capable devices during a separate portion of the data transmission period. Then, at a next block 917, the wireless access point transmits data wirelessly and simultaneously to a plurality of concurrent interfering transmission capable devices. The concurrent interfering transmission capable devices separate simultaneously received data from the access point and take measures against any interference. That is, concurrent interfering transmission capable devices discard any of the encrypted data that are not destined for the corresponding wireless device and accept only the data that is destined for them.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claim.

What is claimed is:

1. A method performed by a wireless access point that communicates a plurality of packets with a plurality of end point wireless devices, the method comprising:
   receiving first of the plurality of packets destined for a single transmissions capable device;
   receiving second and third of the plurality of packets destined for a concurrent interfering transmissions capable device;
   identifying single and concurrent interfering transmissions capable end point devices;
   selecting protocol operation in response to the identification;
   sending the first of the plurality of packets to the single transmissions capable end point devices during a first portion of a frame; and
   transmitting the second and third of the plurality of packets to the concurrent interfering transmissions capable end point devices during a second portion of the frame.

2. The method of claim 1 further comprising:
   receiving a plurality of packets concurrently from the plurality of end point wireless devices; and
   applying detection and separation algorithms to the received plurality of packets to separate the packets arriving from each of the plurality of end point devices.

3. The method of claim 1, wherein the concurrent interfering transmissions comprise a plurality of transmissions in a single radio band.

4. A wireless access point comprising:
   upstream transceiver circuitry;
   wireless transceiver circuitry; and
   processing circuitry coupled to the upstream transceiver circuitry and to the wireless transceiver circuitry, operable in combination to:
   receive first of the plurality of packets destined for a single transmissions capable device;
   receive second and third of the plurality of packets destined for a concurrent interfering transmissions capable device;
   identify single and concurrent interfering transmissions capable end point devices;
   select protocol operation in response to the identification;
   send the first of the plurality of packets to the single transmissions capable end point devices during a first portion of a frame; and
   transmit the second and third of the plurality of packets to the concurrent interfering transmissions capable end point devices during a second portion of the frame.

5. The access point of claim 4, wherein the second receiver circuitry is operable to:
  receive a plurality of packets concurrently from the plurality of end point wireless devices; and
  apply detection and separation algorithms to the received plurality of packets to separate the packets arriving from each of the plurality of end point devices.

6. The wireless access point of claim 4, wherein concurrent interfering transmissions comprise a plurality of transmissions in a single radio band.

7. A wireless access point comprising:
  upstream transceiver circuitry;
  wireless transceiver circuitry; and
  processing circuitry coupled to the upstream transceiver circuitry and to the wireless transceiver circuitry, operable in combination to:
    communicatively couple to a first end point device having first receiver circuitry that supports single receptions;
    communicatively couple to a second end point device having second receiver circuitry that supports concurrent interfering receptions;
    communicatively couple to a third end point device having third receiver circuitry that supports concurrent interfering receptions;
    transmit first data to the first receiver circuitry of the first end point device during a first portion of a frame; and
    concurrently transmits second data and third data during a second portion of the frame, the second data destined for the second receiver circuitry of the second end point device and the third data destined for the third receiver circuitry of the third end point device.

8. The access point of claim 7, wherein the second receiver circuitry is operable to extract the second data from the concurrent transmission of the second data and the third data.

9. The access point of claim 7, wherein the third receiver circuitry is operable to extract the second data and at least a portion of the third data from the concurrent transmission of the second data and the third data.

10. The access point of claim 7, wherein the processing circuitry and wireless transceiver circuitry are further operable to:
  concurrently receive fourth data and fifth data from the second end point device and third end point device during a third portion of the frame; and
  extract the fourth data and the fifth data 11. The access point of claim 7, wherein the processing circuitry and wireless transceiver circuitry are further operable to deliver contention information during a beacon period of the frame.

12. The wireless access point of claim 7, wherein concurrent interfering transmissions comprise a plurality of transmissions in a single radio band.

13. A wireless access point comprising:
  upstream transceiver circuitry;
  wireless transceiver circuitry; and
  processing circuitry coupled to the upstream transceiver circuitry and to the wireless transceiver circuitry, operable in combination to:
    communicatively couple to a first end point device having first receiver circuitry comprising one of a first type of wireless receiver circuitry and a second type of wireless receiver circuitry;
    communicatively couple to a second end point device having second receiver circuitry comprising another of the first type of wireless receiver circuitry and the second type of wireless receiver circuitry; and
    based on interaction with the first end point device and the second end point device, adapt a frame contention of a wireless local area network protocol to accommodate the first receiver circuitry and the second receiver circuitry by defining at least one first frame portion in which transmissions from the access point are limited to single transmissions, and at least one second frame portion wherein concurrent interfering transmissions are permitted.

14. The wireless access point of claim 13, wherein the processing circuitry and wireless transceiver circuitry are further operable to deliver contention information during a beacon period of the frame.

15. The wireless access point of claim 13, wherein the processing circuitry and wireless transceiver circuitry are further operable to communicatively couple to a third end point device having third wireless receiver circuitry comprising both the first type of wireless receiver circuitry and the second type of wireless receiver circuitry, the third wireless receiver circuitry operable to adapt to support the single transmissions and the concurrent interfering transmissions from the wireless transmitter circuitry of the access point.

16. The wireless access point of claim 13, wherein concurrent interfering transmissions comprise a plurality of transmissions in a single radio band.

17. A wireless access point comprising:
  upstream transceiver circuitry;
  wireless transceiver circuitry; and
  processing circuitry coupled to the upstream transceiver circuitry and to the wireless transceiver circuitry, operable in combination to:
    communicatively couple to a first end point device having first receiver circuitry comprising one of a first type of wireless receiver circuitry and a second type of wireless receiver circuitry;
    communicatively couple to a second end point device having second receiver circuitry comprising another of the first type of wireless receiver circuitry and the second type of wireless receiver circuitry;
    support single transmissions for communicating to at least the first type of wireless receiver circuitry and concurrent interfering transmissions for communicating to the second type of wireless receiver circuitry; and
    select between the single transmissions and the concurrent interfering transmissions to accommodate the first receiver circuitry during a first portion of a frame and the second receiver circuitry during a second portion of the frame.

18. The wireless access point of claim 17, wherein the first receiver circuitry comprises either the first type of wireless receiver circuitry or a combination of the first type of wireless receiver circuitry and the second type of wireless receiver circuitry.

19. The wireless access point of claim 17, wherein the processing circuitry and the wireless transceiver circuitry are further operable in combination to communicatively couple to a third end point device having third wireless receiver circuitry comprising both the first type of wireless receiver circuitry and the second type of wireless receiver circuitry, the third wireless receiver circuitry operable to adapt to support the single transmissions and the concurrent interfering transmissions.

20. The wireless access point of claim 17, wherein concurrent interfering transmissions comprise a plurality of transmissions in a single radio band.

21. A wireless access point comprising:
upstream transceiver circuitry;
wireless transceiver circuitry; and
processing circuitry coupled to the upstream transceiver circuitry and to the wireless transceiver circuitry, operable in combination to:
  communicatively couple to a first end point device having first wireless receiver circuitry and first wireless transmitter circuitry, the first wireless receiver circuitry supports concurrent interfering transmissions;
  communicatively couple to a second end point device having a second wireless receiver circuitry and a second wireless transmitter circuitry, the second wireless receiver circuitry supports single transmissions; and
  adapt to deliver single transmissions to communicate with the second end point device during a first portion of a frame; and
  adapt to deliver the concurrent interfering transmissions to communicate with the first end point device during a second portion of the frame.

22. The wireless access point of claim 21, wherein the processing circuitry and the wireless transceiver circuitry are further operable in combination to:
  communicatively couple to a third end point device having fourth wireless receiver circuitry and fourth wireless transmitter circuitry; and
  support both single transmissions and concurrent interfering transmissions with the third end point device.

23. The wireless network infrastructure of claim 21, the third wireless transmitter circuitry adapts to deliver either single transmissions or the concurrent interfering transmissions to communicate with the third end point device.

24. The wireless access point of claim 21, wherein concurrent interfering transmissions comprise a plurality of transmissions in a single radio band.

25. A wireless access point comprising:
upstream transceiver circuitry;
wireless transceiver circuitry; and
processing circuitry coupled to the upstream transceiver circuitry and to the wireless transceiver circuitry, operable in combination to:
  communicatively couple to a plurality of end point devices, a first of the plurality of end point devices having a first wireless receiver circuitry and a first wireless transmitter circuitry, a second of the plurality of end point devices having a second wireless receiver circuitry and a second wireless transmitter circuitry;
  an access point having a third wireless receiver circuitry and a third wireless transmitter circuitry;
  manage a protocol that adapts to enable or disable support for concurrent interfering transmissions from the first wireless transmitter and the second wireless transmitter;
  direct the adaptation based on interaction with both the first of the plurality of end point devices and the second of the plurality of end point devices; and
  wherein the protocol defines at least one first portion of a frame wherein transmissions are limited to single transmissions.

26. The wireless access point of claim 25, wherein concurrent interfering transmissions comprise a plurality of transmissions in a single radio band.

27. The wireless access point of claim 25, wherein the protocol defines at least one second portion of the frame wherein concurrent interfering transmissions are permitted.

\* \* \* \* \*

UNITED STATES PATENT AND TRADEMARK OFFICE
CERTIFICATE OF CORRECTION

PATENT NO. : 8,194,587 B2
APPLICATION NO. : 11/595346
DATED : June 5, 2012
INVENTOR(S) : James D. Bennett It is certified that error appears in the above-identified patent and that said Letters Patent is hereby corrected as shown below:

In the Claims:

Col. 13, line 46, in claim 10: after "fifth data" insert --.--

Signed and Sealed this
Thirteenth Day of August, 2013

Teresa Stanek Rea
*Acting Director of the United States Patent and Trademark Office*